(12) United States Patent  
Hattori (10) Patent No.: US 7,113,199 B2  
(45) Date of Patent: Sep. 26, 2006

(54) TANDEM IMAGE FORMING DEVICE WITH REDUCED FOOTPRINT

(75) Inventor: Tomoaki Hattori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/642,205

(22) Filed: Aug. 18, 2003

(65) Prior Publication Data

US 2004/0100547 A1 May 27, 2004

(30) Foreign Application Priority Data

Aug. 19, 2002 (JP) .......................... 2002-2385081

(51) Int. Cl.
 *B41J 2/435* (2006.01)
 *G03G 15/01* (2006.01)
(52) U.S. Cl. ...................................... 347/243; 399/107
(58) Field of Classification Search ................ 347/115, 347/116, 117, 152; 399/110, 112, 113, 116, 399/119, 122, 223, 299, 302
See application file for complete search history.

(56) References Cited

U.S. PATENT DOCUMENTS

| 5,633,744 | A | | 5/1997 | Nakajima |
| 5,752,137 | A | * | 5/1998 | Haneda ....................... 399/223 |
| 5,848,329 | A | * | 12/1998 | Aoyama et al. ............ 399/113 |
| 6,085,051 | A | * | 7/2000 | Miyasaka et al. ............ 399/110 |
| 6,381,428 | B1 | * | 4/2002 | Yamamoto et al. .......... 399/116 |
| 6,445,899 | B1 | | 9/2002 | Sato |
| 6,501,925 | B1 | | 12/2002 | Yamamoto et al. |
| 6,522,861 | B1 | * | 2/2003 | Tokutake et al. ............ 399/401 |
| 6,697,586 | B1 | | 2/2004 | Yamamoto et al. |
| 6,917,777 | B1 | * | 7/2005 | Nishiwaki et al. .......... 399/223 |

FOREIGN PATENT DOCUMENTS

| JP | A 08-171063 | 7/1996 |
| JP | A-09-114172 | 5/1997 |
| JP | A-10-48898 | 2/1998 |
| JP | A 2000-321840 | 11/2000 |
| JP | A-2001-134042 | 5/2001 |
| JP | A-2001-183885 | 7/2001 |
| JP | A-2001-201910 | 7/2001 |
| JP | A-2001-249061 | 9/2001 |
| JP | A-2001-356552 | 12/2001 |
| JP | A-2002-82507 | 3/2002 |
| JP | A-2002-207395 | 7/2002 |

\* cited by examiner

*Primary Examiner*—Huan Tran
(74) *Attorney, Agent, or Firm*—Oliff & Berridge, PLC (57) ABSTRACT

A tandem color laser printer 1 is provided with a photosensitive drum unit 15, a developing unit 14, and a scanning unit 13 for each color. The developing units 14, each including a main developer unit 25 and a toner hopper 24, and the scanning units 13, which irradiate laser beam, are alternately stacked vertically to overlap with each other in the vertical direction. This arrangement eliminates space required when arranging the developing units 14 and scanning units 13 side by side, thereby reducing the footprint of the color laser printer 1.

22 Claims, 7 Drawing Sheets

TANDEM IMAGE FORMING DEVICE WITH REDUCED FOOTPRINT

BACKGROUND OF THE INVENTION

1. Field of the Invention

The present invention relates to an image forming device, such as a laser printer.

2. Description of Related Art

In the field of laser printers capable of forming color images, there has recently been an increasing popularity in tandem-style color laser printers. These laser printers are provided with a photosensitive drum for each color and a charging device, scanning device, and developing device disposed around the photosensitive drum.

In this type of tandem color laser printer, a toner image in each color borne on the respective photosensitive drum is transferred onto a sheet of paper one after another, enabling the rapid formation of color images.

In a color laser printer proposed in Japanese patent application publication No. 2000-321840, for example, photosensitive drums for each color are stacked vertically and paper is also conveyed vertically.

However, since the developing device and the scanning device corresponding to each photosensitive drum are arranged side by side in the color laser printer disclosed in Japanese patent application publication No. 2000-321840, the area required for installing the color laser printer (footprint) is considerably large.

SUMMARY OF THE INVENTION

In view of the foregoing, it is an object of the present invention to provide an image forming device capable of rapidly forming images using a tandem system while an installing area is smaller, that is, a smaller footprint.

In order to attain the above and other objects, the present invention provides an image forming device. The image forming device includes a plurality of image forming units and a casing that accommodates the plurality of image forming units. Each of the plurality of image forming units is provided for each of a plurality of colors. The plurality of image forming units is aligned vertically. Each of the plurality of image forming units includes a photosensitive member, an exposing device that exposes the photosensitive member to light to form electrostatic latent images thereon, and a developing device that develops the electrostatic latent images formed on the photosensitive member using developer to form developer images. The developing device and the exposing device are aligned to overlap with each other in a vertical direction, when the casing is disposed in an orientation in which the casing is intended to be used.

Preferably, the image forming device further includes a transferring device that transfers the developer images from the photosensitive member to a recording medium. The developing device recovers developer remaining on the photosensitive member after the transferring device has transferred the developer images from the photosensitive member to the recording medium.

Preferably, the photosensitive member is in a form of a drum having a peripheral surface. The drum is rotatable about its own central axis. The exposing device is positioned to irradiate a laser beam onto a first region on the peripheral surface of the drum, and the developing device is positioned in confrontation with the drum on a second region on the peripheral surface of the drum. The second region is in a non-overlapping relation with the first region.

Preferably, the peripheral surface of the drum has a third region upstream from the first region in a rotational direction of the drum. The third region is in a non-overlapping relation with the first region and the second region. The image forming unit may further include a charging device that electrically charges the drum. The charging device is disposed in confrontation with the third region. Also preferably, the charging device is in a form of a roller.

Preferably, the peripheral surface of the drum has a fourth region upstream from the third region in a rotational direction of the drum. The fourth region is in a non-overlapping relation with the first region, the second region, and the third region. The image forming unit may further include a cleaning device that temporarily captures developer remaining on the drum after the transferring device has transferred the developer images from the drum to the recording medium, and subsequently discharges the captured developer onto the drum. The cleaning device is disposed in confrontation with the fourth region.

The image forming device may further include a circuit board that controls each component of the image forming device. The circuit board is aligned to overlap with the developing device and the exposing device in a vertical direction.

Alternatively, the exposing device may include a deflecting unit that deflects a laser beam and a reflecting mirror. The laser beam from the deflecting unit is irradiated on the photosensitive member after being bent once by the reflecting mirror. Also, the photosensitive member may be in a form of a belt.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE PREFERRED EMBODIMENTS

An image forming device according to an embodiment of the present invention will be described while referring to the accompanying drawings.

Figure 1:
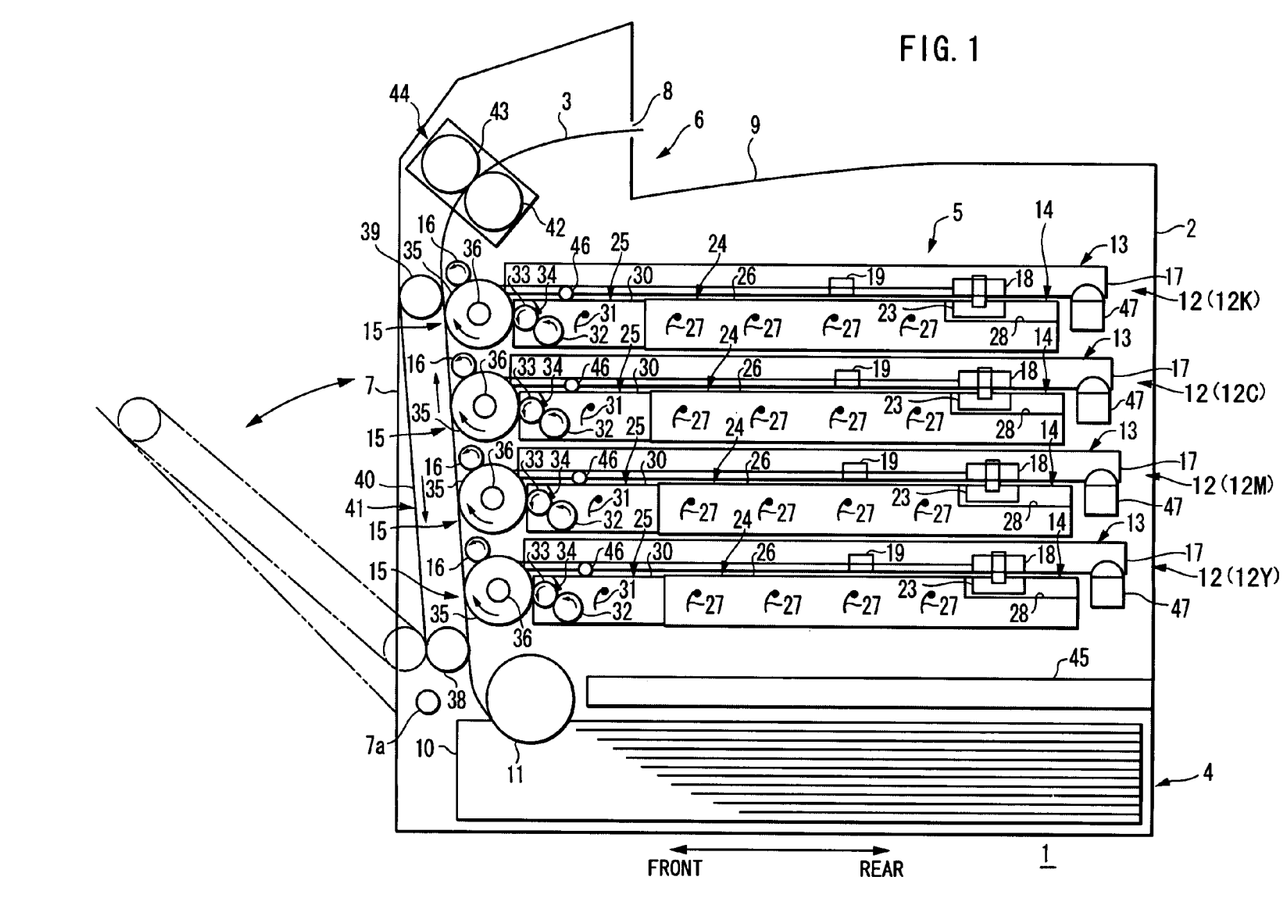
FIG. 1 is a side cross-sectional view showing a color laser printer according to an embodiment of the present invention.

As shown in FIG. 1, a color laser printer 1 includes a main casing 2 and, within the main casing 2, a feeder unit 4 for feeding a paper 3, an image forming unit 5 for forming images on the paper 3 supplied from the feeder unit 4, and a discharging unit 6 for discharging the paper 3 after image formation.

The main casing 2 is formed in the shape of a substantially rectangular box. A front cover 7 is provided on the front side of the main casing 2 (hereinafter, the side of the main casing 2 in which a feed roller 11 is disposed in the color laser printer 1 will be referred to as the front side and the opposite side as the rear side). The bottom end of the front cover 7 is pivotally supported by a hinge 7a, enabling the front cover 7 to be opened as indicated by the two-dot chain lines. The top of the main casing 2 includes a discharge hole 8 described later through which the paper 3 is discharged, and a discharge tray 9 formed as a depression in the top of the main casing 2. The discharge tray 9, which deepens toward the discharge hole 8, is provided for stacking the paper 3 discharged through the discharge hole 8.

The feeder unit 4 is disposed in the bottom section of the main casing 2 and includes a feed tray 10 detachably mounted in the feeder unit 4, and the feed roller 11 disposed above one end of the feed tray 10 (above the front side of the feed tray 10). The feed tray 10 can be inserted into or removed from the main casing 2 horizontally through the front side thereof.

Sheets of the paper 3 can be stacked in the feed tray 10. The rotation of the feed roller 11 supplies the topmost sheet of the paper 3 vertically upward one sheet at a time the sheets of the paper 3 are supplied sequentially between a transfer belt 40 and each of a plurality of photosensitive drums 35.

The image forming unit 5 includes processing units 12, a transfer unit 41, and a fixing unit 44.

The processing units 12 are provided one for each color. That is, the processing units 12 include a yellow processing unit 12Y, a magenta processing unit 12M, a cyan processing unit 12C, and a black processing unit 12K. The processing units 12 are disposed parallel to each other and stacked vertically or disposed to overlap with each other in the vertical direction, such that adjacent processing units 12 are separated by a predetermined interval.

Each of the processing units 12 includes a scanning unit 13, a developing unit 14, a photosensitive drum unit 15, and a charging roller 16 disposed inside the photosensitive drum unit 15.

Each scanning unit 13 includes a scanner casing 17 that is fixed to the main casing 2 and oriented horizontally. Within the scanner casing 17, the scanning unit 13 includes a laser beam emitting unit 18a (see FIG. 2), a polygon mirror 18, and a lens 19.

Figure 2:
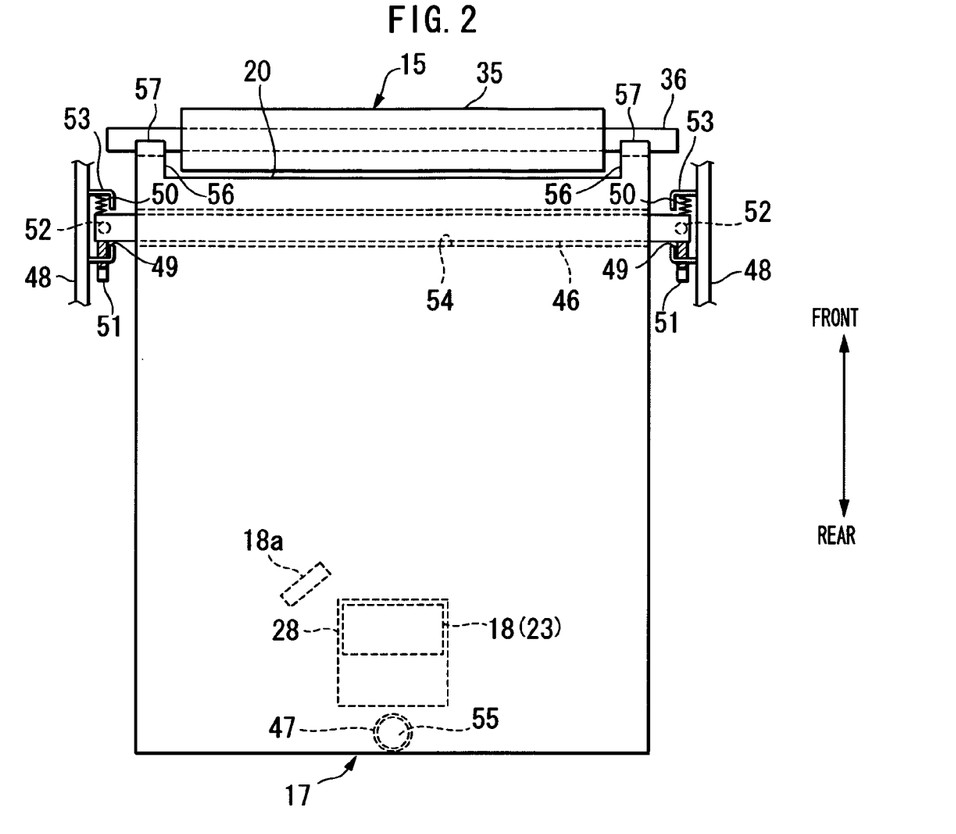
FIG. 2 is a plan view showing a scanning unit and a photosensitive drum unit provided in the color laser printer of FIG. 1.
Figure 3:
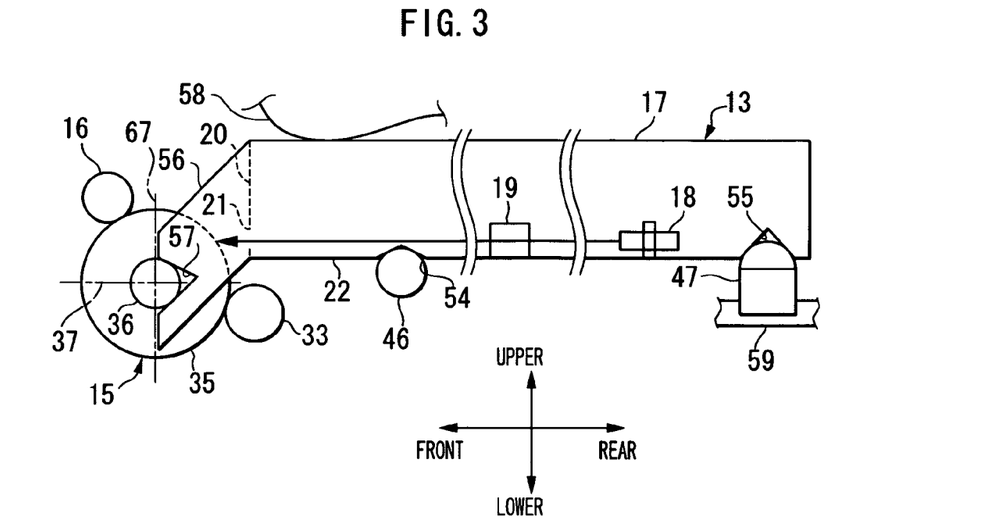
FIG. 3 is a side cross-sectional view showing the scanning unit and the photosensitive drum unit in the color laser printer of FIG. 1.
Figure 4:
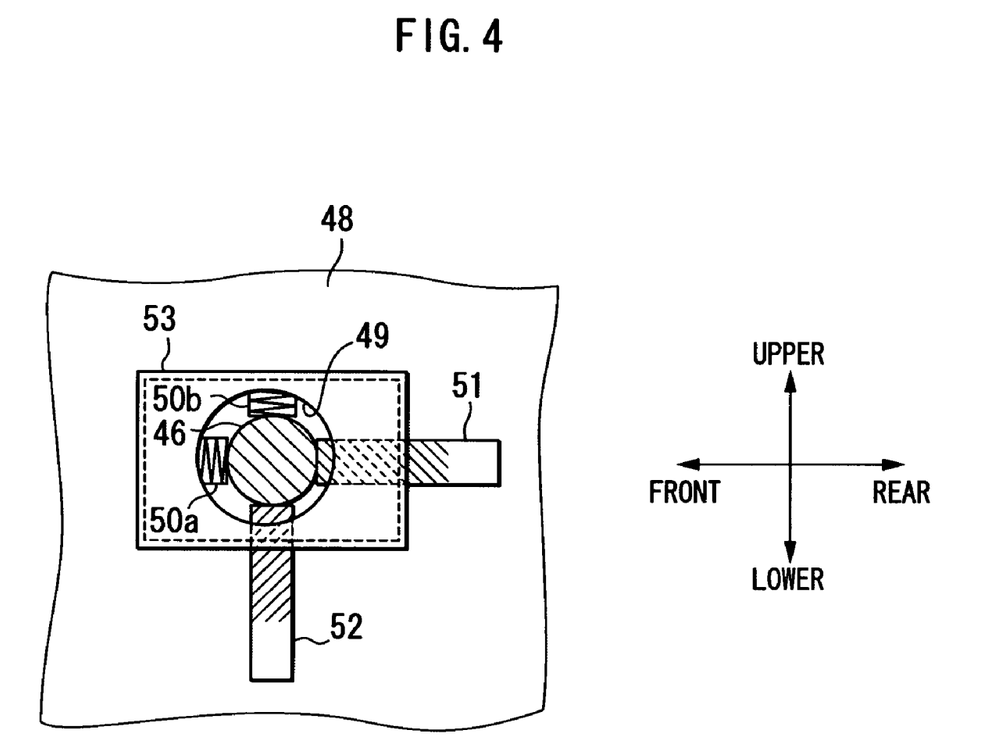
FIG. 4 is a side view showing the support construction of a first positioning member in a main casing of the color laser printer of FIG. 1.

Each scanner casing 17 has a substantially elongated box shape with an open top. As shown in FIG. 3, the scanner casing 17 includes a front wall 20 and a projecting window 21 formed as an opening in the front wall 20 through which a laser beam is projected. A transparent cover (not shown) through which a laser beam can pass is provided in the projecting window 21. The transparent cover prevents toner, dust, or other foreign matter from entering the scanner casing 17 through the projecting window 21. The scanner casing 17 also includes a bottom wall 22. A front side groove 54 and a back side groove 55 are formed in the bottom outer surface of the bottom wall 22 for receiving a first positioning member 46 and a second positioning member 47, respectively, described later. As shown in FIG. 2, the front side groove 54 is formed along a direction orthogonal to the front-to-rear direction of the scanner casing 17 (hereafter referred to as the widthwise direction) in the front side of the bottom wall 22. As shown in FIG. 3, the front side groove 54 is formed in an approximate V-shape in a cross-sectional view. As shown in FIG. 2, the back side groove 55 is formed in a conical shape in the rear side of the bottom wall 22 and the widthwise center of the scanner casing 17. As will be described in more detail later, the position of the scanner casing 17 in relation to the main casing 2 is fixed by fitting the first positioning member 46 into the front side groove 54 and the second positioning member 47 into the back side groove 55.

As shown in FIG. 2, the laser beam emitting unit 18a is disposed diagonally in front of the polygon mirror 18 in order to emit a laser beam toward the polygon mirror 18.

As shown in FIG. 1, the polygon mirror 18 is disposed in the rear side of the scanner casing 17. As shown in FIG. 3, the lens 19 is disposed between the polygon mirror 18 and the projecting window 21 in the front-to-rear direction of the scanner casing 17 (horizontal direction). The laser beam emitting unit 18a, the polygon mirror 18, and the lens 19 are disposed on the top surface of the plate shaped bottom wall 22 and arranged along the same horizontal plane. By disposing the laser beam emitting unit 18a, the polygon mirror 18, and the lens 19 on the same surface of the bottom wall 22, the precision of the laser beam emitted from the laser beam emitting unit 18a and projected off the polygon mirror 18 through the lens 19 can be improved.

A motor 23 is provided on the lower outer side of the bottom wall 22 for driving the polygon mirror 18 to rotate. A metal cover (not shown) covers the open top of the scanner casing 17.

The laser beam emitting unit 18a in the scanning unit 13 emits a laser beam based on image data. The laser beam is reflected by the polygon mirror 18, which is rotated by the motor 23, passed through the lens 19, and is projected through the projecting window 21 (see FIG. 3) linearly in a horizontal direction. The laser beam is irradiated in a high speed scanning motion onto the photosensitive drums 35.

The scanning units 13 are stacked vertically, More specifically, each scanning unit 13 is disposed above the corresponding developing unit 14 such that the developing units 14 and the scanning units 13 are alternately stacked vertically In other words, the developing units 14 and the scanning units 13 are disposed to overlap with each other in the vertical direction.

Each developing unit 14 is oriented horizontally and is individually and detachably mounted in the main casing 2.

The developing unit 14 includes a toner hopper 24 and a main developer unit 25. The toner hopper 24 and the main developer unit 25 are disposed along the same horizontal plane, with the toner hopper 24 on the rear side and the main developer unit 25 on the front side, and can be detachably fixed together.

Each toner hopper 24 includes a hopper casing 26 for accommodating a toner of a different color. Agitators 27 are provided in the hopper casing 26.

The hopper casing 26 has a substantially elongated box shape. A depressed portion 28 capable of accommodating the motor 23 is formed in the top of the hopper casing 26 on the rear side.

As shown in FIG. 2, the depressed portion 28 has a rectangular shape from a plan view and is formed in a top wall of the hopper casing 26 near the rear end of the same.

The motor 23 protruding downward externally from the bottom of the scanner casing 17 is accommodated in the depressed portion 28, while the motor 23 and the developing unit 11 are disposed to overlap with each other in the horizontal direction. Accordingly, vertical space need not be allocated solely for the thickness of the motor 23, making it possible to manufacture a smaller color laser printer 1 in the vertical direction. By providing the depressed portion 28 for accommodating the motor 23, it is possible to conserve space in horizontal directions while maintaining the capacity of the hopper casing 26 to accommodate toner, thereby enabling the color laser printer 1 to be manufactured with a smaller footprint.

A plurality (four) of the agitators 27 is spaced at predetermined intervals in the horizontal direction.

Each toner hopper 24 accommodates a positively charged nonmagnetic single-component polymerized toner having a different color for each corresponding processing unit 12, including yellow for the yellow processing unit 12Y, magenta for the magenta processing unit 12M, cyan for the cyan processing unit 12C, and black for the black processing unit 12K. This type of polymerized toner is produced through a suspension polymerization or an emulsion polymerization method and is formed of particles substantially spherical in shape in order to have excellent fluidity.

Through the rotations of the agitators 27, toner accommodated in the toner hopper 24 is conveyed from the rear of the hopper casing 26 toward the front and is supplied to the main developer unit 25.

By providing the plurality of agitators 27 at predetermined intervals horizontally within the hopper casing 26, the agitators 27 can efficiently convey toner toward the main developer unit 25. Hence, the hopper casing 26 can be formed in an elongated shape to reduce the vertical size of the color laser printer 1.

The main developer unit 25 includes a developer casing 30 formed in a substantially elongated box shape and, within the developer casing 30, an agitator 31, a supply roller 32, a developing roller 33, and a thickness-regulating blade 34.

The agitator 31 is disposed in the rear of the developer casing 30. The supply roller 32 is disposed in front of the agitator 31.

The supply roller 32 includes a metal roller shaft covered by a roller formed of a conductive sponge. The supply roller 32 is supported rotatably and at a nip point in contact with the developing roller 33. The supply roller 32 is capable of rotating counterclockwise, such that the surface of the supply roller 32 moves in the opposite direction to the developing roller 33 at the nip point.

The developing roller 33 is disposed in front of the supply roller 32, while contacting the supply roller 32 with pressure. The supply roller 32 includes a metal roller shaft covered by a roller formed of a resilient material such as a conductive rubber material. More specifically, the roller portion of the developing roller 33 is formed of a two-layer construction including a resilient roller part formed of an electrically conductive urethane rubber, silicon rubber, EPDM rubber, or the like including fine carbon particles, and a coating layer covering the surface of the roller part and having as its primary component urethane rubber, urethane resin, polyimide resin, or the like. The developing roller 33 confronts and contacts the photosensitive drums 35 and is supported to rotate in the counterclockwise direction. The surface of the developing roller 33 moves in the same direction in which the surface of the photosensitive drums 35 moves at the nip part. A developing bias applying circuit (not shown) applies a developing bias to the developing roller 33 during a developing operation.

The thickness-regulating blade 34 is disposed above the developing roller 33. The thickness-regulating blade 34 includes a main blade part formed of a metal leaf spring and a pressing part provided on one end of the main blade part. The pressing part is formed of an insulating silicon rubber having a semi-circular cross-section. The thickness-regulating blade 34 is supported by the other end of the main blade part on the developer casing 30 above the developing roller 33. The pressing part provided on the one end of the main blade part is disposed above the supply roller 32 and pressingly contacts the top surface of the developing roller 33 by the elastic force of the main blade part.

Toner supplied from the toner hopper 24 to the main developer unit 25 is further supplied to the supply roller 32 by the rotation of the agitator 31 provided in the main developer unit 25. As the supply roller 32 rotates, toner borne on the surface of the supply roller 32 is supplied to the developing roller 33. At this time, the toner is positively tribocharged between the supply roller 32 and the developing roller 33. As the developing roller 33 rotates, toner supplied onto the developing roller 33 is carried between the thickness-regulating blade 34 and the developing roller 33, forming a thin layer of toner having a fixed thickness on the developing roller 33.

The developing units 14 are stacked together vertically. More specifically, the developing units 14 and the scanning units 13 are alternately stacked to overlap with each other in the vertical direction above the feed tray 10, as described above. Accordingly, the space for arranging the developing units 14 and scanning units 13 along a horizontal direction is unnecessary, enabling the footprint of the color laser printer 1 to be decreased an amount equivalent to this space. With this arrangement, each scanning unit 13 can be disposed near the corresponding photosensitive drum unit 15, and each photosensitive drum unit 15 can be positioned by the scanning unit 13.

The photosensitive drum unit 15 is disposed on the front side of the developing unit 14. Each photosensitive drum unit 15 is detachably mounted in the main casing 2. As shown in FIG. 3, the photosensitive drum unit 15 includes the photosensitive drum 35, which is a cylindrical metal tube formed of aluminum or the like; and a central shaft 36 penetrating through the center of the photosensitive drum 35 in the axial direction for supporting the same. The surface of the photosensitive drum 35 is covered with a photosensitive layer formed of an organic photosensitive material having the main component of polycarbonate. The developing unit 14 is detachably mounted on the photosensitive drum unit 15.

The photosensitive drum 35 is supported in a casing of the photosensitive drum unit 15 so as to rotate clockwise while in contact with the transfer belt 40. Hence, the surface of the photosensitive drum 35 moves in the same direction as the transfer belt 40 at the nip point where the photosensitive drum 35 contacts the transfer belt 40.

The photosensitive drum units 15 are stacked vertically to overlap with one another in the vertical direction. Each photosensitive drum 35 is disposed to confront and contact the developing roller 33 in the horizontal direction.

As shown in FIG. 3, the scanning unit 13 irradiates a laser beam onto the upper side of the photosensitive drum 35 in relation to an imaginary horizontal plane 37 dividing the photosensitive drum 35 through the central shaft 36, while the developing roller 33 of the developing unit 14 confronts the lower side of the photosensitive drum 35. Hence, the polygon mirror 18 and the lens 19 of each scanning unit 13 and the part of each corresponding photosensitive drum 35 that is irradiated by a laser beam from the scanning unit 13 are arranged on the same horizontal plane.

With this construction, each scanning unit 13 is disposed such that the laser beam is irradiated on the upper side of the photosensitive drum 35 with regard to the imaginary horizontal plane 37 that divides the photosensitive drum 35 through the central shaft 36, while each developing unit 14 confronts the lower side of the photosensitive drum 35. As a result, the scanning unit 13 and developing unit 14 are efficiently disposed in relation to the photosensitive drum 35, enabling the size of the color laser printer 1 to be reduced in both the horizontal and vertical directions. By this efficient arrangement, the size of the photosensitive drum 35 can also be reduced.

Further, the laser beam can be linearly projected from the scanning unit 13 to irradiate the photosensitive drum 35. Hence, the scanning unit 13 can be constructed thinner, enabling the size of the color laser printer 1 to be reduced in the vertical direction. Further, by projecting the laser beam linearly from the polygon mirror 18, a reflecting mirror for bending the laser beam is unnecessary, thereby reducing manufacturing costs.

As shown in FIG. 1, the charging roller 16 is disposed above the photosensitive drum 35 in the photosensitive drum unit 15. The charging roller 16 contacts the photosensitive drum 35 at a position downstream in the rotational direction of the photosensitive drum 35 from the point at which the transfer belt 40 contacts the photosensitive drum 35. The charging roller 16 is a positively charging roller for uniformly charging the surface of the photosensitive drum 35 with a positive polarity when a charging bias applying circuit (not shown) applies a charging bias to the charging roller 16. The charging roller 16 is supported in the casing of the photosensitive drum unit 15 and can rotate counterclockwise. The surface of the charging roller 16 moves in the same direction as the photosensitive drum 35 at the nip point where the charging roller 16 contacts the photosensitive drum 35.

The charging rollers 16 are stacked vertically. More specifically, each charging roller 16 is disposed above the corresponding photosensitive drum 35 such that the charging rollers 16 and photosensitive drums 35 are alternately stacked vertically to overlap with one another in the vertical direction.

As shown in FIG. 3, each charging roller 16 is disposed in confrontation with the corresponding photosensitive drum 35 on the upper side of the photosensitive drum 35 in relation to the horizontal plane 37 that passes through the central shaft 36 and on the front side of the photosensitive drum 35 in relation to a vertical plane 67 that also passes through the central shaft 36 and is orthogonal to the horizontal plane 37. As a result, the charging roller 16, scanning unit 13, and developing unit 14 are efficiently disposed in relation to the photosensitive drum 35, enabling the size of the color laser printer 1 to be reduced in both the horizontal and vertical directions. Through this efficient arrangement, the size of the photosensitive drum 35 can also be reduced.

With this arrangement, the scanning unit 13 and charging roller 16 are aligned to overlap with each other in the horizontal direction, thereby enabling the color laser printer 1 to be reduced in size in the vertical direction.

Above all, the color laser printer 1 of the embodiment employs a contact-type charging roller 16 rather than a noncontact-type Scorotron charger. Hence, the region of the photosensitive drum 35 opposed by the charging roller 16 can be decreased since the charging roller 16 need only contact the photosensitive drum 35 and does not require a opposing region of a certain width in the rotational direction of the photosensitive drum 35 as does the Scorotron type charger. The Scorotron charger requires an opposing region to charge the photosensitive drum 35 with charging wires. Hence, the size of the photosensitive drum 35 can be reduced, and the size of the color laser printer 1 can be reduced in the horizontal and vertical directions.

As shown in FIG. 1, when the photosensitive drum 35 is rotated in each of the processing units 12, first the is surface of the photosensitive drum 35 contacting the charging roller 16 is given a uniform positive charge. As the photosensitive drum 35 rotates, a laser beam is projected from the scanning unit 13 onto the surface of the photosensitive drum 35 in a high-speed scanning motion, forming an electrostatic latent image based on image data. Next, as the surface of the photosensitive drum 35 confronts the developing roller 33, the latent image formed on the surface of the photosensitive drum 35 is transformed into a visible image when the positively charged toner borne on the surface of the developing roller 33 is selectively attracted to portions of the photosensitive drum 35 that were exposed to the laser beam and, therefore, have a lower potential than the rest of the surface having a uniform positive charge. In this way, a reverse image is formed. A toner image for each color is formed on the corresponding photosensitive drum 35 of each processing unit 12.

The transfer unit 41 is disposed vertically to confront the vertically arranged photosensitive drums 35 and on the opposite side of the photosensitive drums 35 from the scanning units 13 in the main casing 2. The transfer unit 41 includes a transfer drive roller 38, a transfer follow roller 39, and the transfer belt 40, which is an endless belt.

The transfer drive roller 38 is positioned lower than the photosensitive drum 35 of the yellow processing unit 12Y. The transfer follow roller 39 is positioned above the photosensitive drum 35 of the black processing unit 12K. The transfer belt 40 is formed of a synthetic resin, such as a conductive polycarbonate or a polyimide including dispersed carbon or other conductive particles. The transfer belt 40 is wrapped around the transfer drive roller 38 and the transfer follow roller 39. The transfer belt 40 is arranged such that the contact surface on the rear side of the belt loop confronts and contacts each of the photosensitive drums 35 at a position downstream in the rotational direction of the photosensitive drums 35 from the contact positions with the developing rollers 33.

The transfer follow roller 39 follows the driving of the transfer drive roller 38, while the transfer belt 40 runs in a counterclockwise loop around the transfer drive roller 38 and the transfer follow roller 39, such that the surface of the transfer belt 40 moves in the same direction as the surfaces of each of the photosensitive drums 35 at the points of contact therebetween. A transfer bias applying circuit not shown in the drawings applies a transfer bias to the transfer belt 40.

The transfer unit 41 is supported on the front cover 7 and moves integrally with the front cover 7 when the front cover 7 is pivoted to its open position, as shown by the two-dot chain lines. When the front cover 7 is closed, the transfer belt 40 is pressed against each of the photosensitive drums 35.

When the front cover 7 is in a closed state, the contact surface between the paper 3 and the transfer belt 40 is slanted from the upstream side to the downstream in the direction that the transfer belt 40 conveys the paper 3, such that the weight of the paper 3 is applied to the transfer belt 40. That is, the contact surface between the paper 3 and the transfer belt 40 is slanted by a predetermined angle from the gravitational direction, such that the weight of the paper 3 is applied to the transfer belt 40. More specifically, the transfer follow roller 39 is disposed slightly in front of a vertical line passing through the transfer drive roller 38, and the transfer belt 40 is looped around the two. Hence, the transfer belt 40 is slightly slanted with its top side slightly forward and its bottom side slightly rearward.

In the color laser printer 1, the processing units 12 are arranged slightly offset from each other in the horizontal direction, corresponding to the slope of the transfer belt 40. Specifically, the magenta processing unit 12M is disposed slightly forward in relation to the yellow processing unit 12Y in the bottommost position; the cyan processing unit 12C is positioned slightly forward from the magenta processing unit 12M; and the black processing unit 12K in the topmost position is positioned slightly forward from the cyan processing unit 12C. Accordingly, the photosensitive drums 35 of the processing units 12 are positioned gradually forward from bottom to top in order to maintain reliable contact with the transfer belt 40.

As a sheet of the paper 3 supplied from the feeder unit 4 is conveyed upward on the surface of the transfer belt 40, which runs in a loop by the driving of the transfer drive roller 38 and the following of the transfer follow roller 39, toner images of each color formed on the photosensitive drums 35 of each processing unit 12 are sequentially transferred onto the paper 3. In this way, a color image is formed on the paper 3.

For example, a yellow toner image formed on the photosensitive drums 35 in the yellow processing unit 12Y is transferred first onto the paper 3. Next, a magenta toner image formed on the photosensitive drum 35 of the magenta processing unit 12M is transferred onto the paper 3 and superimposed over the yellow toner image transferred previously. The same operations are performed to transfer and superimpose a cyan toner image formed by the cyan processing unit 12C and a black toner image formed by the black processing unit 12K, resulting in the formation of a color image on the paper 3.

The color laser printer 1 includes a photosensitive drum 35 for each color in order to form color images in what is known as a tandem construction. Since the toner image for each color can be formed at approximately the same speed as forming single color images, the color laser printer 1 can form color images rapidly, As described above, the surface at which the paper 3 contacts the transfer belt 40 is slanted from the upstream side toward the downstream side in the conveying direction of the paper 3, such that the weight of the paper 3 is applied to the transfer belt 40. Hence, the paper 3 is reliably maintained in close contact with the contact surface of the transfer belt 40. Therefore, even when the photosensitive drums 35 are arranged vertically, the paper 3 can be conveyed reliably along the transfer belt 40 to undergo image formation.

The fixing unit 44 is disposed above the transfer unit 41 on the downstream end of the paper conveying direction. The fixing unit 44 includes a heating roller 42 and a pressure roller 43. The heating roller 42 includes a metal tube, the surface of which is coated with a release agent. A halogen lamp is built into the heating roller 42 along its axial direction. The halogen lamp heats the surface of the heating roller 42 to a fixing temperature. The pressure roller 43 is disposed to pressingly contact the heating roller 42.

After a color image is transferred onto the paper 3, the paper 3 passes between the heating roller 42 and pressure roller 43 to fix the color image on the paper 3 with heat.

The discharging unit 6 includes the discharge hole 8 and the discharge tray 9 described above. After passing through the fixing unit 44, the paper 3 is discharged out of the main casing 2 through the discharge hole 8 and stacked on top of the discharge tray 9.

The color laser printer 1 of the present embodiment employs what is known as a cleanerless developing system in each processing unit 12 for recovering residual toner, wherein the developing roller 33 recovers toner remaining on the surface of the photosensitive drum 35 after the transfer process. In this cleanerless developing system, the charging roller 16 applies a positive charge to the surface of the photosensitive drum 35 as the surface of the photosensitive drum 35 rotates and confronts the charging roller 16. As the photosensitive drum 35 continues to rotate, the surface of the photosensitive drum 35 arrives opposite the developing roller 33. After a transfer operation, toner remaining on the surface of the photosensitive drum 35 is recovered by the developing roller 33 at this time. Use of this type of cleanerless developing system eliminates the need for a waste toner collecting section used to recover and collect residual toner. As the space is no longer necessary for waste toner collecting sections, it is possible to dispose the developing units 14 and the scanning units 13 to overlap with each other in the vertical direction, thereby reducing the footprint required for the color laser printer 1.

A circuit board 45 is provided in the color laser printer 1 for controlling all components therein. The circuit board 45 has a flat shape and is disposed between the feed tray 10 and yellow processing unit 12Y in the vertical direction. By disposing the circuit board 45 in this way, the circuit board 45 is arranged to overlap with the developing units 14 and the scanning units 13 in the vertical direction. Hence, it is possible to further s conserve space in the horizontal direction, thereby reducing the area required for installing the color laser printer 1. The circuit board 45 can be a low-voltage circuit board, a high-voltage circuit board, a control circuit board, an engine circuit board, or the like.

By opening the front cover 7 of the color laser printer 1, the photosensitive drum unit 15 and the developing unit 14 of each processing unit 12 can be integrally installed into or removed from the main casing 2. It is also possible to replace only the photosensitive drum unit 15, only the toner hopper 24, or only the main developer unit 25.

The scanner casing 17 of each processing unit 12 is positioned within the main casing 2 by the first positioning member 46 and the second positioning member 47, which serve to adjust the position of the scanning unit 13.

The first positioning member 46 is a support shaft for adjusting the levelness of the scanning unit 13 in relation to the transfer belt 40. As shown in FIG. 2, the first positioning member 46 spans the width of the main casing 2 and is supported on both side walls 48 of the main casing 2. More specifically, a base unit 53 is provided on each of the side walls 48 of the main casing 2. A loose insertion hole 49 is formed in each of the base units 53. A first spring 50a, a second spring 50b, a horizontal adjusting screw 51, and a vertical adjusting screw 52 are provided to face in toward the center of the loose insertion hole 49. The first positioning member 46 is inserted into the loose insertion holes 49 and supported by the first spring 50a, the second spring 50b, the horizontal adjusting screw 51, and the vertical adjusting screw 52.

The first spring 50a is disposed on the inside of the loose insertion hole 49, extending horizontally from the front side toward the rear side.

The second spring 50b is disposed inside the loose is insertion hole 49 and extends vertically from the upper side to the lower side.

The horizontal adjusting screw 51 can be screwed into or out from the loose insertion hole 49 in a horizontal direction from the rear side of the loose insertion holes 49 toward the front side, that is, in a direction opposing the first spring 50a (180 degrees around the loose insertion hole 49 from the first spring 50a). The vertical adjusting screw 52 can be screwed into or out from the loose insertion hole 49 in a vertical direction from the lower side of the loose insertion hole 49 toward the upper side, that is, in a direction opposing the second spring 50b (180 degrees around the loose insertion hole 49 from the second spring 50b).

When the first positioning member 46 is inserted into the loose insertion hole 49, the first spring 50a and the second spring 50b urge the first positioning member 46 toward the rear side in the horizontal direction and toward the lower side in the vertical direction, respectively. By screwing the horizontal adjusting screw 51 into the loose insertion hole 49, the first positioning member 46 moves forward against the urging force of the first spring 50a. By screwing the horizontal adjusting screw 51 out from the loose insertion hole 49, the first positioning member 46 moves rearward by the urging force of the first spring 50a. By screwing the vertical adjusting screw 52 into the loose insertion hole 49, the first positioning member 46 moves upward against the urging force of the second spring 50b. By screwing the vertical adjusting screw 52 out from the loose insertion hole 49, the first positioning member 46 moves downward by the urging force of the second spring 50b Hence, by adjusting the horizontal adjusting screw 51 and the vertical adjusting screw 52, the first positioning member 46 can be supported at an appropriate position within the main casing 2 in the front-to-rear and vertical directions.

As shown in FIG. 3, the first positioning member 46 is supported on the front side of the scanning unit 13 by being fitted into the front side groove 54 formed in the front side of the bottom wall 22. Accordingly, the front-to-rear position and the vertical position of the front side of the scanning unit 13 is determined by the first positioning member 46, the position of which is adjusted by the horizontal adjusting screw 51 and the vertical adjusting screw 52. Hence, the levelness of the scanning unit 13 in relation to the transfer belt 40 is primarily adjusted and determined by the first positioning member 46.

The second positioning member 47 is a rounded screw and serves primarily to adjust the exposure position on the photosensitive drum 35 that is exposed by the laser beam from the scanning unit 13. As shown in FIG. 3, the second positioning member 47 is provided in a main frame 59 of the main casing 2, below and on the rear side of the scanning unit 13 The second positioning member 47 can be screwed into and out of the main frame 59 in the vertical direction.

As shown in FIG. 2, the second positioning member 47 fits into the rear side groove 55 formed in the rear side of the bottom wall 22 to support the rear side of the scanning unit 13. The vertical position of the rear side of the scanning unit 13 is determined by adjusting the vertical position of the second positioning member 47. Hence, the exposure position on the photosensitive drum 35 that is exposed by the laser beam from the scanning unit 13 is primarily adjusted by the second positioning member 47.

While the position of the scanning unit 13 in the main casing 2 is set by adjusting the first positioning member 46 and the second positioning member 47, as described above, a leaf spring 58 supported on the main casing 2 also presses down on the scanning unit 13, as shown in FIG. 3. With this construction, the position of the scanning unit 13 is reliably fixed.

Further, positioning frame parts 56 are provided on the front wall 20 of the scanner casing 17. By directly fixing the central shaft 36 of the photosensitive drum 35 in the positioning frame parts 56, the relative positions of the photosensitive drum unit 15 and the scanning unit 13 are determined.

More specifically, the rectangular plate-shaped positioning frame parts 56 protrude diagonally forward and downward from both widthwise ends of the front wall 20, as shown in FIGS. 2 and 3. The positioning frame parts 56 are formed integrally with the scanner casing 17. As shown in FIGS. 3, a substantially V-shaped support groove 57 is formed in the free end of each positioning frame part 56 in which the central shaft 36 of the photosensitive drum 35 can be fitted.

As described above, the photosensitive drum unit 15 in each processing unit 12 is positioned by fitting the central shaft 36 of the photosensitive drum 35 in the positioning frame parts 56 on the scanning unit 13, which is positioned in relation to the main casing 2.

As described above, the relative positions of the photosensitive drum unit 15 and the scanning unit 13 are determined by directly fixing the same. Hence, a laser beam can be accurately irradiated from the scanning unit 13 onto the photosensitive drum 35, reliably forming electrostatic latent images.

Moreover, the positioning frame parts 56 are integrally formed with the bottom wall 22, which supports the laser beam emitting unit 18a, the polygon mirror 16, and the lens 19, and the photosensitive drum unit 15 is directly fixed to the positioning frame parts 56. Hence, a laser beam emitted from the laser beam emitting unit 18a, reflected off the polygon mirror 18, and passed through the lens 19 can be accurately irradiated on the photosensitive drum 35, thereby reliably forming electrostatic latent images.

Since the scanning unit 13 is directly fixed to the central shaft 36, which supports the photosensitive drum 35, the relative positions of the scanning unit 13 and the photosensitive drum unit 15 can be determined through a simple construction. As a result, a laser beam can be accurately irradiated on the photosensitive drum 35, thereby reliably forming electrostatic latent images.

Since the central shaft 36 of the photosensitive drum 35 is directly fixed to the positioning frame parts 56, the image forming device can reliably form electrostatic latent images through more accurate irradiation of a laser beam.

Further, when the front cover 7 is closed, as described above, the transfer belt 40 is pressed against the photosensitive drums 35. Hence, the central shafts 36 of the photosensitive drums 35 are pressed toward the positioning frame parts 56 of each scanning unit 13. Therefore, the position of each photosensitive drum 35 in relation to the corresponding scanning unit 13 can be determined more reliably, enabling a more reliable formation is of electrostatic latent images. Moreover, the positions of these components can be reliably set through a simple construction where the transfer belt 40 presses against the photosensitive drums 35, eliminating the need for a special pressing member.

Since the scanning unit 13 can be fixed in a position within the main casing 2 by the first positioning member 46 and the second positioning member 47 for each processing unit 12, the color laser printer 1 of the present embodiment can achieve more reliable positioning of the scanning unit 13 and the photosensitive drum unit 15, which is positioned based on the scanning unit 13.

Since the position of the scanning unit 13 can be adjusted by the first positioning member 46 and the second positioning member 47, each scanning unit 13 can be set to an optimal position. Accordingly, the scanning unit 13 can accurately irradiate a laser beam on the photosensitive drum 35, thereby more reliably forming electrostatic latent images.

Since the levelness of the scanning unit 13 in relation to the transfer belt 40 can be adjusted by the first positioning member 46, the levelness of the photosensitive drum 35, which is positioned by the scanning unit 13, can be adjusted in relation to the transfer belt 40. Hence, reliable image formation can be achieved by accurately positioning the photosensitive drums 35 in contact with the paper 3 conveyed by the transfer belt 40.

Since the exposure position on the photosensitive drum 35 exposed by the scanning unit 13 can be adjusted by the second positioning member 47, the scanning unit 13 can accurately irradiate a laser beam on the photosensitive drum 35, thereby more reliably forming electrostatic latent images.

The photosensitive drum unit 15 and developing unit 14 are configured such that the photosensitive drum 35 and developing roller 33 are positioned in confrontation with each other, as described above, when the developing unit 14 is mounted on the photosensitive drum unit 15.

Figure 5:
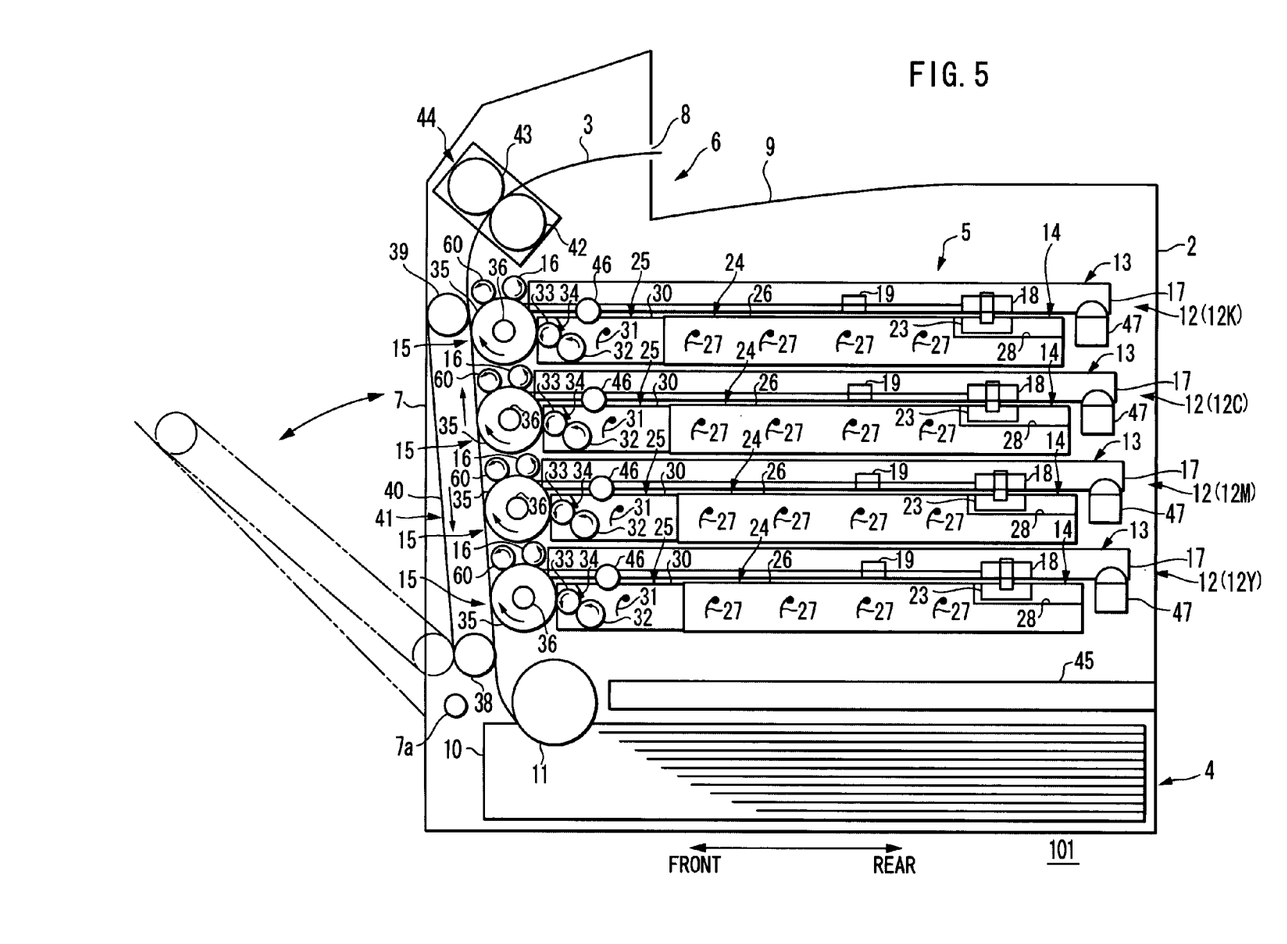
FIG. 5 is a side cross-sectional view showing another color laser printer provided with a cleaning roller according to a modification.

As described above, the color laser printer 1 of the present embodiment employs a cleanerless developing system to recover residual toner. However, as shown in a modification in FIG. 5, a color laser printer 101 is provided with a cleaning roller 60 in each processing unit 12. In FIG. 5, parts and components identical to those in FIG. 1 are designated by the same reference numerals to avoid duplicating description. The cleaning roller 60 temporarily captures toner remaining on the photosensitive drum 35 after a transfer operation and returns the captured toner to the photosensitive drum 35 at a predetermined timing.

As shown in FIG. 5, the cleaning roller 60 is disposed in each processing unit 12 in front of the scanning unit 13 and above the photosensitive drum 35. The cleaning roller 60 contacts the photosensitive drum 35 downstream from the point that the transfer belt 40 contacts the photosensitive drum 35 in the rotational direction of the photosensitive drum 35 and upstream from the point that the charging roller 16 contacts the photosensitive drum 35.

The cleaning roller 60 includes a metal roller shaft covered by a roller that is formed of a resilient member of a conductive rubber material or the like. The cleaning roller 60 is supported to be rotatable in a counterclockwise rotation, such that the surface of the cleaning roller 60 moves in the same direction as the photosensitive drum 35 at a nip point in which the cleaning roller 60 contacts the photosensitive drum 35. When capturing residual toner, an attracting bias is applied to the cleaning roller 60 in order to attract the residual toner from the photosensitive drum 35. When discharging the residual toner onto the photosensitive drum 35, a discharging bias of reverse polarity to the attracting bias is applied to the cleaning roller 60 in order to discharge the residual toner from the cleaning roller 60 onto the photosensitive drum 35.

In the modification shown in FIG. 5, the cleaning rollers 60 are stacked vertically. Specifically, each cleaning roller 60 is disposed above the corresponding photosensitive drum 35, such that the cleaning rollers 60 and the photosensitive drums 35 are alternately stacked vertically to overlap with each other in the vertical direction.

In the modification shown in FIG. 5, the charging roller 16 and the cleaning roller 60 are disposed on the upper side of the photosensitive drum 35 in relation to the horizontal plane 37 that passes through the central shaft 36.

However, the charging roller 16 is disposed on the rear side of the photosensitive drum 35 in relation to the vertical plane 67 (see FIG. 3) that passes through the central shaft 36, and the cleaning roller 60 is disposed on the front side in relation to the vertical plane 67. In this way, the charging roller 16, cleaning roller 60, scanning unit 13, and developing unit 14 can be efficiently disposed in relation to the photosensitive drum 35, thereby enabling the size of the color laser printer 101 to be reduced in both the horizontal and vertical directions. With this efficient arrangement, it is also possible to reduce the size of the photosensitive drum 35.

With this arrangement, the scanning unit 13, cleaning roller 60, and charging roller 16 are arranged to overlap with one another in the horizontal direction or along the approximately same horizontal plane, enabling the color laser printer 101 to be reduced in size vertically.

In the color laser printer 101 according to the modification shown in FIG. 5, toner remaining on the photosensitive drum 35 of each processing unit 12 after a transfer process is temporarily captured by the cleaning roller 60 to which an attracting bias has been applied. The toner captured on the cleaning roller 60 is later discharged onto the photosensitive drum 35 by applying a discharging bias during a non-transfer period (such as between transfer operations performed on consecutive sheets of the paper 3 or after an image forming process is completed), and recovered by the developing roller 33. By providing the cleaning roller 60, residual toner can be temporarily captured by the cleaning roller 60 even when there is a large amount of residual toner on the photosensitive drum 35 and can then be efficiently recovered by the developing roller 33.

In the modification of FIG. 5, a charging roller 16 is employed as a charging device. However, a Scorotron charger, for example, can also be used in place of the charging roller 16. In another modification shown in FIG. 6, parts and components identical to those in FIG. 5 are designated by the same reference numerals to avoid duplicating description.

Figure 6:
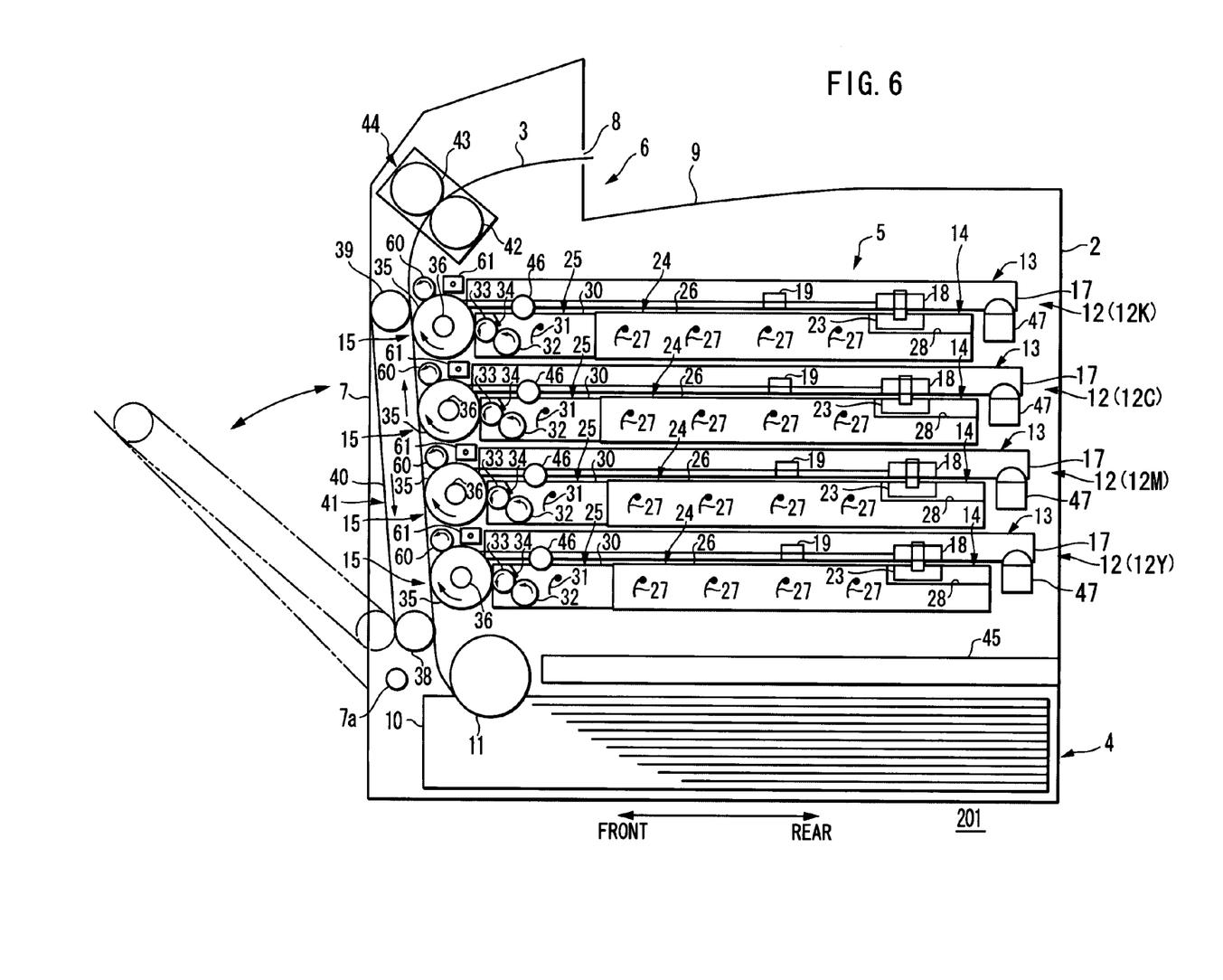
FIG. 6 is a side cross-sectional view showing another color laser printer provided with a cleaning roller and a Scorotron charger in place of the charging roller according to another modification.

In this modification, a color laser printer 201 is provided with a Scorotron charger 61. The Scorotron charger 61 is provided in each processing unit 12 at the same position as the charging roller 16 of the color laser printer 101 shown in FIG. 5 (in other words, above the photosensitive drum 35, downstream from the cleaning roller 60 in the rotational direction of the photosensitive drum 35, and upstream from the developing roller 33). The Scorotron charger 61 confronts the photosensitive drum 35, but is separated a predetermined distance therefrom. The Scorotron charger 61 is a positive-charging Scorotron charger for generating a corona discharge from a tungsten wire or the like.

Figure 8:
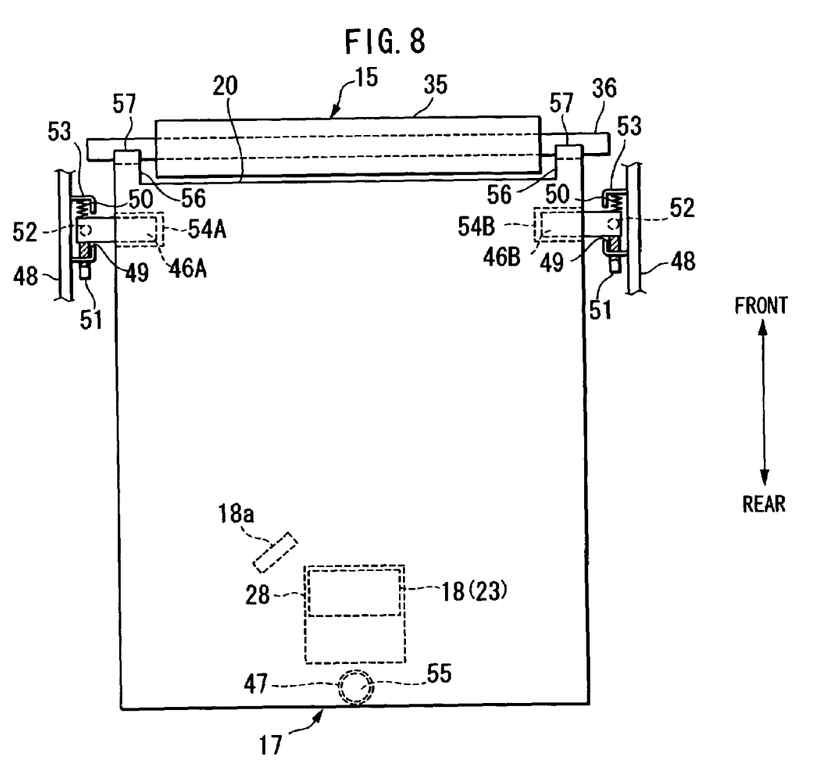
FIG. 8 is a plan view showing a scanning unit supporting mechanism according to a modification of the embodiment shown in FIG. 1.
Figure 9A:
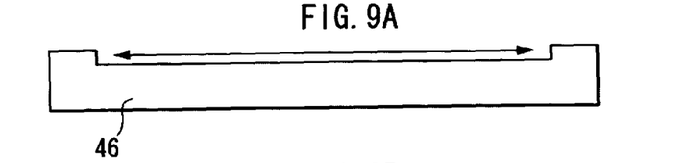
FIG. 9A is a cross-sectional view showing a first positioning member according to a modification of the embodiment shown in FIG. 3.
Figure 9B:
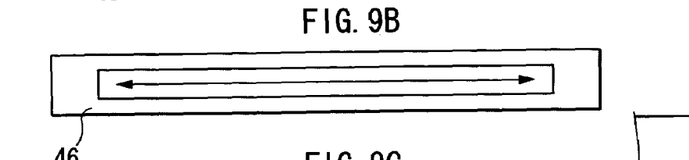
FIG. 9B is a cross-sectional view showing a first positioning member according to another modification of the embodiment shown in FIG. 3.
Figure 9C:
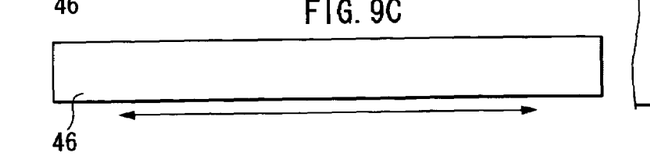
FIG. 9C is a cross-sectional view showing a first positioning member according to still another modification of the embodiment shown in FIG. 3.
Figure 9D:
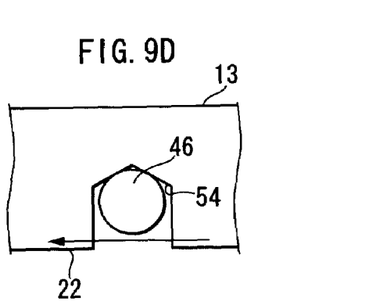
FIG. 9D is a side cross-sectional view of the modification shown in FIG. 9C.

In the modifications shown in FIGS. 5 and 6, the front side of the scanning unit 13 is separately formed with first and second side grooves 54A and 54B as shown in FIG. 8. First and second positioning members 46A and 46B (which are collectively designated by reference numeral "46" in FIGS. 5 and 6) are fitted into the first and second side grooves 54A and 54B, respectively. The first and second side grooves 54A and 54B only extend to positions near the end faces of the photosensitive drum 35, the laser beam irradiated onto the photosensitive drum 35 is not bothered by the first and second positioning members 46A and 46B regardless of the vertical positions of the first and second positioning members 46A and 46B.

Figure 7:
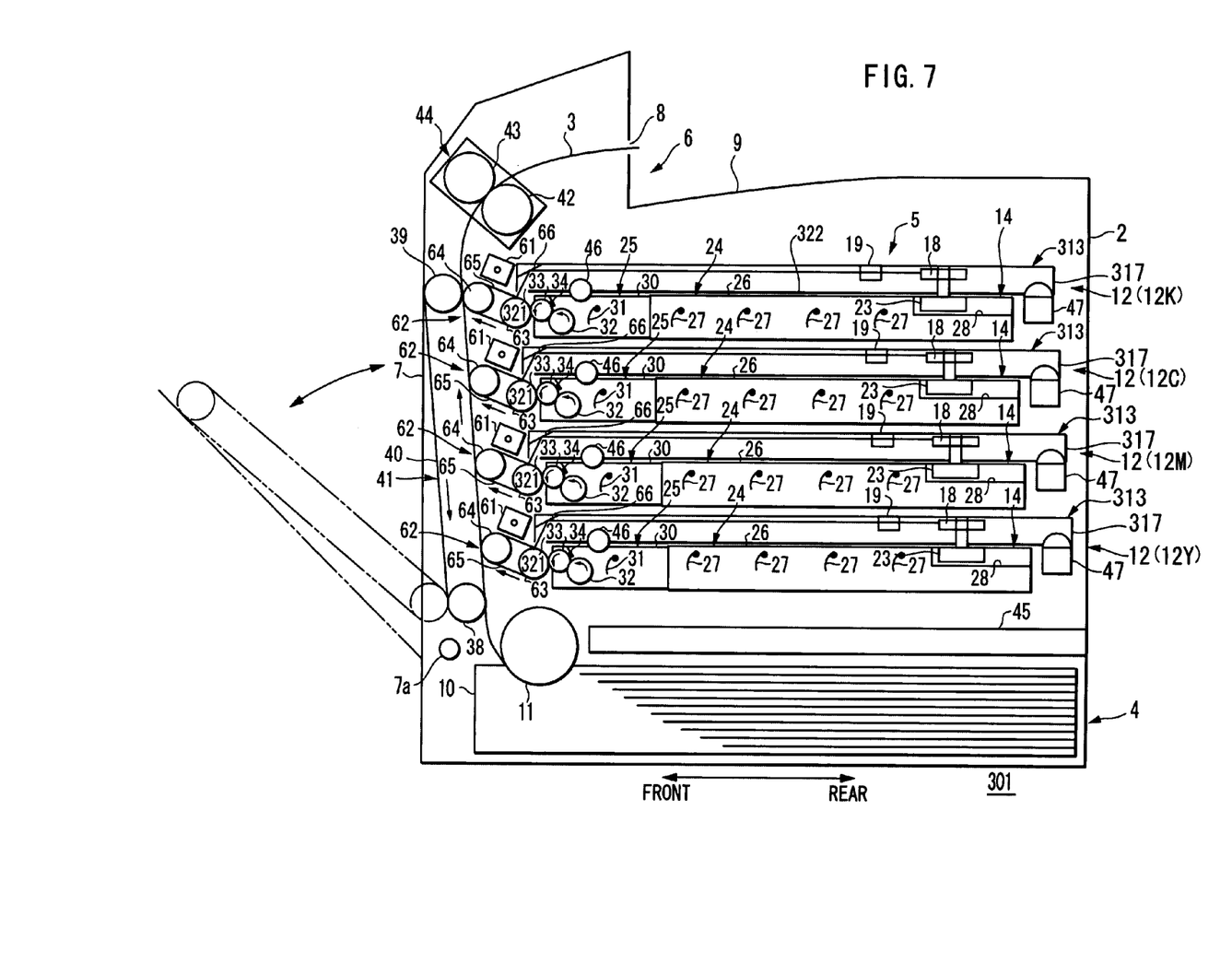
FIG. 7 is a side cross-sectional view showing another color laser printer provided with a photosensitive belt unit in place of the photosensitive drum unit, and a Scorotron charger in place of the charging roller according to another modification.

In another modification shown in FIG. 7, a color laser printer 301 is provided with a photosensitive belt unit 62 having a photosensitive belt 65 in place of the photosensitive drum unit 15. In the modification of FIG. 7, parts and components identical to those in FIG. 1 are designated by the same reference numerals to avoid duplicating description when employing the Scorotron charger 61, the Scorotron charger 61 must confront a predetermined surface area of the photosensitive drum 35 and must be separated a predetermined distance therefrom as shown in FIG. 6. However, by employing the photosensitive belt unit 62, the scanning unit 13 and developing unit 14 can be disposed efficiently around the photosensitive belt 65 by forming the photosensitive belt unit 62 in a desired shape, thereby reducing the size of the color laser printer 301.

Each photosensitive belt unit 62 can be individually and detachably mounted in the main casing 2. The photosensitive belt unit 62 includes a photosensitive drive roller 63, a photosensitive follow roller 64, and the photosensitive belt 65, which is an endless belt. The photosensitive drive roller 63 and the photosensitive follow roller 64 are separated by a predetermined distance. The photosensitive belt 65 is looped around the photosensitive drive roller 63 and the photosensitive follow roller 64. A synthetic resin including a photosensitive layer formed of an organic photosensitive material is provided on the surface of the photosensitive belt 65.

The photosensitive drive roller 63 is positioned on the front side of the developing roller 33 and confronts the same via the photosensitive belt 65. The photosensitive follow roller 64 is positioned diagonally in front of and above the photosensitive drive roller 63 and opposes the rear side of the transfer belt 40 via the photosensitive belt 65. Accordingly, the photosensitive belt unit 62 is positioned in front of and diagonally down from a scanning unit 313 between the developing roller 33 and the transfer belt 40. The photosensitive belt unit 62 is arranged horizontally, but slightly slanted with the front end up. By slanting the photosensitive belt unit 62 slightly from the horizontal, the required horizontal space can be reduced.

In each photosensitive belt unit 62 having this construction, the photosensitive follow roller 64 follows the driving of the photosensitive drive roller 63, while the photosensitive belt 65 runs around the photosensitive drive roller 63 and the photosensitive follow roller 64 clockwise. The surface of the photosensitive belt 65 moves in the same direction as that of the developing roller 33 at the point of contact between the photosensitive belt 65 and developing roller 33. Likewise, the surface of the photosensitive belt 65 moves in the same direction as that of the transfer belt 40 at the point of contact between the photosensitive belt 65 and transfer belt 40.

The Scorotron charger 61 in each processing units 12 is disposed above the photosensitive belt 65 and on the front side of the scanning unit 313. The Scorotron charger 61 is positioned downstream from the transfer belt 40 and upstream from the exposure position of the laser beam in relation to the rotational direction of the photosensitive belt 65. The Scorotron charger 61 confronts the photosensitive belt 65 and is separated a predetermined distance therefrom.

With this construction, the scanning unit 13 cannot irradiate the photosensitive belt 65 with a laser beam, even when the laser beam is projected horizontally from the polygon mirror 18. Therefore, a single reflecting mirror 66 is provided in a scanner casing 317 of the scanning unit 313, and a projecting window 321 is formed in a bottom wall 322 of the scanner casing 317.

The reflecting mirror 66 is disposed in the front end of the scanner casing 317 and is slanted in order to reflect a horizontally irradiated laser beam downward.

The projecting window 321 is formed in the front end of the bottom wall 322, such that the laser beam reflected by the reflecting mirror 66 can be projected diagonally forward and downward.

Hence, a laser beam emitted from the laser beam emitting unit 18a based on image data reflects off the polygon mirror 18, which is driven to rotate by the motor 23, and proceeds horizontally from the polygon mirror 18 via the lens 19. Subsequently, the laser beam is bent downward by the reflecting mirror 66 and projected through the projecting window 321 of the scanner casing 317. At this point, the laser beam is irradiated in a high-speed scanning motion onto the photosensitive belt 65 positioned diagonally forward and downward.

By providing a single reflecting mirror 66 in the scanning unit 313, the laser beam can be projected from the scanner casing 317 at a predetermined angle, thereby increasing the freedom of arrangement between the scanning unit 313 and the photosensitive belt unit 62. As a result, the laser beam can be accurately irradiated onto the photosensitive belt 65, even if the photosensitive belt 65 is positioned diagonally forward and downward in relation to the scanning unit 313. Further, by using only one reflecting mirror 66, the vertical space required to provide the reflecting mirror 66 is less than that required for the polygon mirror 18. Hence, the scanning unit 313 is formed thin without changing its thickness.

With this construction, the scanning unit 313 and the Scorotron charger 61 are arranged to overlap with each other in the horizontal direction or along the same horizontal plane, even when the Scorotron charger 61 is disposed parallel to and in confrontation with the photosensitive belt unit 62. Hence, the color laser printer 301 can be made more compact in the vertical direction.

While the invention has been described in detail with reference to the specific embodiment thereof, it would be apparent to those skilled in the art that various changes and modifications may be made therein without departing from the spirit of the invention.

For example, in the above-described embodiment, a cleanerless developing system is employed in each processing unit 12. However, it is also possible, for example, to provide a waste toner collecting section in dead space within the main casing 2, as long as the color laser printer 1 is maintained in a compact size. In this way, toner remaining on the photosensitive drum 35 after a transfer operation can be collected all together in the waste toner collecting section.

Further, in the embodiment described above, the motor 23 of the scanning unit 13 is accommodated in the depressed portion 28 formed in the hopper casing 26 in each processing unit 12. However, it is also possible to form the hopper casing 26 shorter in the horizontal direction, and dispose the motor 23 outside the hopper casing 26 on the rear side of the same, such that the two are arranged side by side horizontally or to overlap with each other in the horizontal direction.

In the embodiment described above, the first spring 50a and the second spring 50b are used to urge the first positioning member 46 inserted into the loose insertion hole 49. However, it is possible to replace the first spring 50a and the second spring 50b by a single spring in the loose insertion hole 49 that extends at a 45 degree angle from the horizontal and the vertical, extending from the front-upper direction of the loose insertion hole 49 toward the rear-lower direction.

Further, in the embodiment described above, a tandem color laser printer 1 of a type that transfers images directly from each photosensitive drum 35 onto the paper 3 is used as an example. But the present invention is not limited to this type of device. For example, a tandem color laser printer of a type that first transfers toner images of each color from each photosensitive member to an intermediate transfer member and subsequently transfers the entire full color image at once onto the paper can also be employed.

In the embodiment described above, four processing units 12 are provided, including a yellow processing unit 12Y, a magenta processing unit 12M, a cyan processing unit 12C, and a black processing unit 12K. However, the number of the processing units 12 is not limited to four. It is possible to form color images with, four example, three processing units 12, including a yellow processing unit 12Y, a magenta processing unit 12M, and a cyan processing unit 12C. It is also possible to provide more than four processing units 12 to form color images with even better color quality.

The first positioning member 46 shown in FIGS. 2 and 3 can be modified as shown in FIGS. 9A through 9D. In the modification shown in FIG. 9A, the upper portion of the first positioning member 46 is cut away except both sides thereof to allow the laser beam to pass through the cut away portion. In the modification shown in FIG. 9B, the first positioning member 46 is formed with an opening at the center portion thereof to allow the laser beam to pass therethrough. In the modification shown in FIGS. 9C and 9D, the bottom wall 22 of the scanning unit 13 is formed with a groove 54. The groove 54 is an upwardly elongated shape adapted for receiving the first positioning member 46. In this modification, the laser beam passes through a space formed below the first positioning member 46 when the same is fitted into the groove 54.

What is claimed is:

1. An image forming device comprising:
   a plurality of image forming units, each of the plurality of image forming units being provided for each of a plurality of colors, the plurality of image forming units being aligned vertically; and
   a casing that accommodates the plurality of image forming units, each of the plurality of image forming units comprising:
      a photosensitive member;
      an exposing device that exposes the photosensitive member to light to form electrostatic latent images thereon; and
      a developing device that develops the electrostatic latent images formed on the photosensitive member using developer to form developer images,
   wherein the developing device and the exposing device are aligned to overlap with each other in a vertical direction, when the casing is disposed in an orientation in which the casing is intended to be used; and
   wherein the exposing device includes:
      a deflecting unit that deflects a laser beam; and
      a drive unit that drives the deflecting unit, the drive unit and the developing device being aligned to overlap with each other in a horizontal direction.

2. The image forming device as claimed in claim 1,
   wherein the exposing device further includes a laser beam emitting unit that emits a laser beam;
      wherein the deflecting unit includes a polygon minor that reflects the laser beam emitted by the laser beam emitting unit;
      wherein the exposing device further includes a lens through which the laser beam reflected by the polygon minor passes; and
   wherein the polygon mirror, the lens, and a corresponding portion of the photosensitive member that is irradiated by the laser beam are arranged on a same plane, the laser beam that has passed through the lens being directly irradiated onto the corresponding portion of the photosensitive member.

3. The image forming device as claimed in claim 1, wherein the same plane is a horizontal plane.

4. The image forming device as claimed in claim 1, wherein the photosensitive member and the developing device are detachably mounted on the casing.

5. The image forming device as claimed in claim 1, wherein at least three image forming units are accommodated in the casing.

6. The image forming device as claimed in claim 1, wherein the developing device comprises:
   a developer accommodating unit that accommodates developer;
   a developer bearing member provided to confront the photosensitive member, the developer bearing member bearing developer; and
   a plurality of developer conveying members aligned substantially in a horizontal direction in the developer accommodating unit, the plurality of developer conveying members conveying developer to the developer bearing member.

7. The image forming device as claimed in claim 1, wherein the photosensitive member comprises a photosensitive-member-side positioning member, and the exposing device comprises an exposing-device-side positioning member, wherein the photosensitive-member-side positioning member directly engages the exposing-device-side positioning member.

8. The image forming device as claimed in claim 7, wherein the exposing device further includes:
   a laser beam emitting unit that emits a laser beam;
   wherein the deflecting unit deflects the laser beam emitted from the laser beam emitting unit; and
   wherein the exposing device further includes:
      a lens; and
      a support frame that supports the laser beam emitting unit, the deflecting unit, and the lens, wherein the exposing-device-side positioning member is formed integrally with the support frame.

9. The image forming device as claimed in claim 7, wherein the photosensitive member comprises:
   a photosensitive drum; and
   a shaft that supports the photosensitive drum, and wherein the photosensitive-member-side positioning member is the shaft.

10. The image forming device as claimed in claim 7, further comprising:
   a recording medium conveying device that conveys a recording medium, the recording medium conveying device being disposed on a side opposite from the exposing device with regard to the photosensitive member, wherein the recording medium conveying device presses the photosensitive member toward the exposing device.

11. The image forming device as claimed in claim 1, further comprising:
   a support unit that supports the exposing device, the support unit being fixed to the casing, wherein the exposing device is positioned by the support unit.

12. The image forming device as claimed in claim 11, wherein the support unit comprises a first adjusting unit that adjusts a position of the exposing device.

13. The image forming device as claimed in claim 12, wherein the first adjusting unit comprises:
   a support base member formed with a loose insertion hole;
   a first positioning member being inserted in the loose insertion hole;
   an urging member that applies an urging force to the first positioning member; and
   an adjusting member that adjusts a position of the first positioning member in the loose insertion hole, the adjusting member being movable into the loose insertion hole against the urging force of the urging member and movable out from the loose insertion hole toward a direction of the urging force of the urging member.

14. The image forming device as claimed in claim 12, wherein the support unit comprises a second adjusting unit that adjusts a position exposed to light by the exposing device on the photosensitive member.

15. The image forming device as claimed in claim 1, further comprising:
   a conveying belt that has a surface and conveys a recording medium while holding the recording medium in contact with the surface, the recording medium having a weight, wherein the surface of the conveying belt that contacts the recording medium is slanted by a predetermined angle from a gravitational direction, such that the weight of the recording medium is applied to the conveying belt.

16. The image forming device as claimed in claim 1, wherein a depressed portion is formed in the developing device for accommodating the drive unit.

17. An image forming device comprising:
   a plurality of image forming units, each of the plurality of image forming units being provided for each of a plurality of colors, the plurality of image forming units being aligned vertically; and
   a casing that accommodates the plurality of image forming units, each of the plurality of image forming units comprising:
   a photosensitive member;
   an exposing device that exposes the photosensitive member to light to form electrostatic latent images thereon; and
   a developing device that develops the electrostatic latent images formed on the photosensitive member using developer to form developer images,
   wherein the developing device and the exposing device are aligned to overlap with each other in a vertical direction, when the casing is disposed in an orientation in which the casing is intended to be used; and
   wherein the photosensitive member comprises a photosensitive-member-side positioning member, and the exposing device comprises an exposing-device-side positioning member, wherein the photosensitive-member-side positioning member directly engages the exposing-device-side positioning member.

18. The image forming device as claimed in claim 17, wherein the exposing device comprises:
   a laser beam emitting unit that emits a laser beam;
   a deflecting unit that deflects the laser beam emitted from the laser beam emitting unit;
   a lens; and
   a support frame that supports the laser beam emitting unit, the deflecting unit, and the lens, wherein the exposing-device-side positioning member is formed integrally with the support frame.

19. The image forming device as claimed in claim 17, wherein the photosensitive member comprises:
   a photosensitive drum;
   the photosensitive member-side positioning member includes a shaft that supports the photosensitive drum.

20. The image forming device as claimed in claim 17, further comprising:
   a recording medium conveying device that conveys a recording medium, the recording medium conveying device being disposed on a side opposite from the exposing device with regard to the photosensitive member, wherein the recording medium conveying device presses the photosensitive member toward the exposing device.

21. An image forming device comprising:
   a plurality of image forming units, each of the plurality of image forming units being provided for each of a plurality of colors, the plurality of image forming units being aligned vertically; and
   a casing that accommodates the plurality of image forming units, each of the plurality of image forming units comprising:
   a photosensitive member;
   an exposing device that exposes the photosensitive member to light to form electrostatic latent images thereon;
   a developing device that develops the electrostatic latent images formed on the photosensitive member using developer to form developer images; and
   a support unit that supports the exposing device, the support unit being fixed to the casing, wherein the exposing device is positioned by the support unit,
   wherein the developing device and the exposing device are aligned to overlap with each other in a vertical direction, when the casing is disposed in an orientation in which the casing is intended to be used; and
   wherein the support unit comprises a first adjusting unit that adjusts a position of the exposing device, the first adjusting unit includes:
   a support base member formed with a loose insertion hole;
   a first positioning member being inserted in the loose insertion hole;
   an urging member that applies an urging force to the first positioning member; and
   an adjusting member that adjusts a position of the first positioning member in the loose insertion hole, the adjusting member being movable into the loose insertion hole against the urging force of the urging member and movable out from the loose insertion hole toward a direction of the urging force of the urging member.

22. The image forming device as claimed in claim 21, wherein the support unit further comprises a second adjusting unit that adjusts a position exposed to light by the exposing device on the photosensitive member.

* * * * *